United States Patent [19]

Selby et al.

[11] Patent Number: 4,528,335

[45] Date of Patent: Jul. 9, 1985

[54] POLYMER BLENDS

[75] Inventors: Larry M. Selby; William H. Beever, both of Bartlesville, Okla.

[73] Assignee: Phillips Petroleum Company, Bartlesville, Okla.

[21] Appl. No.: 611,784

[22] Filed: May 18, 1984

[51] Int. Cl.³ .............................................. C08F 283/04
[52] U.S. Cl. .................................................. 525/420
[58] Field of Search ........................................ 525/420

[56] References Cited

U.S. PATENT DOCUMENTS

| | | | |
|---|---|---|---|
| 3,840,501 | 10/1974 | Shue et al. | 260/78 |
| 4,021,596 | 5/1977 | Bailey | 525/390 |
| 4,139,576 | 2/1979 | Yoshimura et al. | 260/857 |
| 4,292,416 | 9/1981 | Shue et al. | 525/420 |
| 4,340,697 | 7/1982 | Aya et al. | 525/420 |
| 4,383,069 | 5/1983 | Davies | 524/299 |

OTHER PUBLICATIONS

Patent Abstracts of Japan, vol. 2, No. 105, p. 1952C78, JPA 53-69255 (Aug. 30, 1978) of Japanese Patent Application 51-144666.

*Primary Examiner*—Melvyn I. Marquis
*Attorney, Agent, or Firm*—S. E. Reiter

[57] ABSTRACT

Novel compositions comprising poly(arylene sulfide) and amorphous polyamide resins are provided. Method for improving the impact strength and shrinkage or warpage of poly(arylene sulfide) resins is also provided.

18 Claims, No Drawings

POLYMER BLENDS

BACKGROUND

This invention relates to polymer blends. In another aspect, this invention relates to the production of poly(arylene sulfide) resins exhibiting improved properties.

Poly(arylene sulfides) have properties which make them suitable for a variety of thermoplastic engineering applications. Desirable physical properties in a resin employed for certain engineering applications include impact strength, low warpage and shrinkage and the like. Unfortunately, poly(arylene sulfide) resins sometimes display considerably shrinkage and warpage when exposed to elevated temperatures. In addition, poly(arylene sulfide) resins sometimes suffer from insufficient impact strength for a desired application.

OBJECTS OF THE INVENTION

It is therefore an object of this invention to provide poly(arylene sulfide) resins having improved properties. Another object of this invention is to provide poly(arylene sulfide) resins having improved impact strength and reduced shrinkage and warpage. A further object of this invention is a method to improve the impact strength and shrinkage or warpage of poly(arylene sulfide) resins.

Other objects, aspects, as well as the several advantages of the invention will be apparent to those skilled in the art upon reading the specification and the appended claims.

SUMMARY OF THE INVENTION

In accordance with the present invention, a new and useful composition comprises a blend of poly(arylene sulfide)-amorphous polyamide.

Further in accordance with the present invention, a method for improving impact strength and shrinkage or warpage of poly(arylene sulfide) resins comprises combining poly(arylene sulfide) with at least one amorphous polyamide wherein the weight ratio of polyamide to poly(arylene sulfide) is about 0.1:100 to about 100:100.

DETAILED DESCRIPTION

Without being limited thereto, uncured or partially cured poly(arylene sulfide) whether homopolymer, copolymer, terpolymer, and the like, or a blend of such polymers, can be used in the practice of our invention. The uncured or partially cured polymer is a polymer the molecular weight of which can be increased by either lengthening of a molecular chain or by crosslinking or by combination of both by supplying thereto sufficient energy, such as heat. Suitable poly(arylene sulfide) polymers include, but are not limited to, those described in U.S. Pat. No. 3,354,129, incorporated by reference herein. Examples of poly(arylene sulfide) polymers suitable for purposes of my invention include poly(2,4tolylene sulfide), poly(4,4'-biphenylene sulfide) and poly(phenylene sulfide). Because of its availability and desirable properties (such as high chemical resistance, nonflammability, and high strength and hardness) poly(phenylene sulfide) is the presently preferred poly(arylene sulfide).

Molding grade poly(arylene sulfide) resins are particularly benefited by the present invention. Generally such poly(arylene sulfide) resins have melting points in the range of about 260° C. to about 400° C. The melt flow of such poly(arylene sulfide) resins, determined by the method of ASTM D 1238-70, modified to a temperature of 316° C. using a 5-Kg weight, will generally be within the range of about 0.5 to about 4,000 g/10 min. and preferably within about 10 to about 1000 g/10 min.

The presently preferred poly(arylene sulfide) resin is a linear, branched or lightly crosslinked poly(phenylene sulfide) resin. Molding grade poly(phenylene sulfide) resins can be molded into a variety of useful articles. The molding techniques are well known in the art. Generally molding is carried out above the melting point or softening point but below the decomposition point of the particular polymer being molded. Suitable molding techniques include injection molding, compression molding, vacuum molding, extrusion and the like.

The polyamides contemplated to be useful in the practice of this invention are amorphous polyamides. Amorphous polyamides or polyamides having amorphous character can be characterized by a non-linear (i.e. branched chain), non-symmetrical, low hydrogen bonding structure. The term amorphous as employed herein is intended to refer to a polymer with low levels of crystallinity and having no definite melting point. The degree of crystallinity of a sample can be determined by a variety of analytical techniques, such as for example X-ray diffraction and differential scanning calorimetry (DSC). The degree of crystallinity is measured by DSC by observing the presence or absence of a melt crystallization temperature (Tmc) for the sample. Thus, a completely amorphous material will have no Tmc. Similarly, a highly crystalline polymer will have a sharp, well-defined Tmc. The degree of crystallinity of a sample can be determined by comparing the size of the Tmc peak for the sample being tested with the Tmc peak of a similar sample with a known degree of crystallinity.

Amorphous polyamides useful in the practice of this invention would be predominantly non-crystalline, i.e., less than about 20% crystallinity. Preferably, the amorphous polyamide employed in the practice of this invention would have less than about 10% crystallinity, and most preferably less than about 5% crystallinity. Samples having less than about 5% crystallinity will give essentially no Tmc peak when analyzed by DSC. Thus, most preferred amorphous polyamides employed in the practice of the invention are those which display essentially no Tmc, i.e., substantially amorphous polyamides.

The amorphous polyamides contemplated to be useful in the practice of this invention include, but are not limited to, amorphous polyamides defined by one of the following generic formulas:

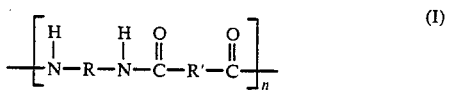

(I)

Each R and R¹ can independently be an alkylene radical having broadly about one to about 30 carbon atoms, preferably about two to about 20 carbon atoms and most preferably about two to about 10 carbon atoms; or a cycloalkylene or arylene radical having broadly about 3 to about 30 carbon atoms, preferably about two to about 20 carbon atoms and most preferably about two to about 10 carbon atoms; or a mixed alkyl-cycloalkyl radical having broadly from about 4 to about 30 carbon atoms, preferably about four to about 20 carbon atoms and most preferably about four to about 10 carbon atoms; or R can also be represented by structure (II):

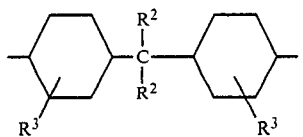

Each $R^2$ and $R^3$ in the above formula independently represents hydrogen or an alkyl radical having broadly from one to about 15 carbon atoms, preferably about one to about five carbon atoms; a cycloalkyl radical having from about 3 to about 16 carbon atoms, preferably about five to about 10 carbon atoms; a mixed alkyl-cycloalkyl radical having from about 6 to about 20 carbon atoms, preferably about 6 to about 10 or an aryl radical having from about 6 to about 20 carbon atoms, preferably about 6 to about 10 carbon atoms. In a preferred embodiment, each $R^2$ is methyl and each $R^3$ is hydrogen. Each n is a whole number and, preferably, falls within the range of about 10 to about 500,000.

Examples of amorphous polyamides suitable for blending with poly(arylene sulfide), particularly poly(phenylene sulfide), include, but are not limited to:

PACP-9/6 (a 50:50 mole ratio copolymer of 2,2'-bis(4-aminocyclohexyl) propane and a 60/40 weight percent mixture of azelaic acid and adipic acid, prepared in accordance with U.S. Pat. No. 3,840,501 which disclosure is hereby incorporated by reference), Zytel 330 (an amorphous polyamide derived from a 50:50 ratio of hexamethylene diamine and an equal mixture of terephthalic acid and isophthalic acid available from duPont), Grilamid (an amorphous polyamide derived from isophthalic acid/bis(4-amino-3-methylcyclohexyl) methane/lauryl lactam available from Union Carbide), Trogamid T (an amorphous polyamide derived from dimethylterephthalate and a 50:50 mixture of 2,2,4- and 2,4,4-trimethylhexamethylene diamine available from Dynamit Nobel) all of which have less than about 2% crystallinity, i.e., greater than 98% amorphous character, and the like and mixtures of any two or more thereof.

The weight ratio of amorphous polyamide to the poly(arylene sulfide) resin can vary widely. It should be noted that the scope of this invention is not limited to any specific range but rather requires only that a finite amount of amorphous polyamide or mixtures of any two or more thereof sufficient to at least partially improve the impact strength and/or reduce resin shrinkage characteristics, be incorporated into the poly(arylene sulfide) resin. Generally the weight ratio of amorphous polyamide to the poly(arylene sulfide) resin is within the range of amount 0.1:100 to about 75:100, preferably in the range of about 0.5:100 to about 50:100, and most preferably in the range of about 0.5:100 to about 10:100.

Incorporation of the amorphous polyamide into the poly(arylene sulfide) resin may be accomplished by any known means such as for example, by dry-blending, melt-blending, solution blending and the like.

The poly(arylene sulfide) resins of this invention can also include other additives such as fillers, fibers such as for example, glass and carbon, pigments, lubricants, stabilizers, softeners, antistatic agents, extenders, other polymers, and the like. The amount of these ingredients used will depend on the particular application, economies, performance needs and so on as can readily be determined by the user.

In injection molding, for example, it is quite common to prepare poly(arylene sulfide) resin compositions containing about 20 to about 50 weight percent of a conventional glass fiber filler, based on the weight of the poly(arylene sulfide) resin and the glass fiber filler. Generally glass fibers of about 0.03 to about 0.5 inches in length are employed. However, glass-filled compositions prepared by feeding a continuous glass roving through an extruder along with the thermoplastic resin are also suitable.

Other fillers include, for example, silica, talc, clay, mica, calcium sulfate and calcuim carbonate.

Poly(arylene sulfide) compounds find wide application due to their outstanding thermal and chemical properties. These properties combined with the improved impact resistance made possible by the practice of the present invention make possible a wide variety of applications such as for example, the manufacture of pump components such as sliding vanes, impeller cases, gage guards, seals and the like. Additional uses include but are not limited to construction of bearings, metal surface coatings for cookware, pipes and the like, appliance parts such as handles, hinges, trays, and the like, automotive parts such as for example oil pans, valve covers and the like.

The following examples are presented to further illustrate the practice of my invention. It will be apparent to those skilled in the art that modifications in the procedures described in these examples can be made without departing from the scope and spirit of my invention.

EXAMPLE I

This example illustrates the effectiveness of an amorphous polyamide, PACP-9/6, to improve the performance properties of a poly(arylene sulfide) resin, poly(phenylene sulfide), hereinafter referred to as PPS. The general procedure for preparing and evaluating test specimens was as follows: PPS (MR03, Phillips Petroleum Co., melt flow 20–65 grams per 10 minutes measured in accordance with test method ASTM D 1238 at 600° F. (316° C.) using a 5 kilogram weight) was extruded through a Davis Standard extruder at 600° F. (316° C.), ground into a granular (pellets) or coarse powder and dried in a 350° F. (177° C.) oven for at least 3 hours. A mixture of 990 grams of dried PPS along with 10 grams of pelleted (0.125 in. to 0.1875 in. diameter) PACP-9/6 (a 50:50 mole ratio copolymer of 2,2-bis(4-aminocyclohexyl)propane and a 60/40 weight percent mixture of azelaic acid and adipic acid prepared in accordance to U.S. Pat. No. 3,840,501 and having greater than 98% amorphous character) was dry blended in a plastic bag for 1 to 2 minutes and molded into test specimens 5 inches×1 inch×0.125 using an Arburg injection molding machine (barrel 608° F., mold 122° F.) with a nitrogen purge. The procedure was then repeated with varying amounts of PPS and PACP-9/6 and the test specimens evaluated.

The test results are summarized in Table I.

TABLE I

Effect of Amorphous Polyamide on the Performance Properties of PPS

| Run No. | Wt. % PPS[b] | Wt. % PACP 9/6 | Izod Impact, J/M Notched | Izod Impact, J/M Unnotched | Flex. Mod., MPa | Flex. Stren., MPa | Tensile Break, MPa | Heat Dist., °C., 1820 KPa | Shrinkage |
|---|---|---|---|---|---|---|---|---|---|
| 1 | 100 | 0 | 37 | 179 | 3356 | 125 | 93.8 | 123 | Great |
| 2 | 99 | 1 | 32 | 350 | 3346 | 121 | 90.0 | 119 | Slight |
| 3 | 98 | 2 | 32 | 267 | 3326 | 118 | 87.2 | 127 | — |
| 4 | 95 | 5 | 32 | 169 | 3214 | 116 | 87.5 | 127 | — |
| 5 | 90 | 10 | 37 | 277 | 3180 | 113 | 82.0 | 133 | None |
| 6 | 85 | 15 | 37 | 322 | 3084 | 112 | 79.2 | 155 | None |
| 7 | 75 | 25 | 35 | 290 | 2965 | 122 | 78.6 | 160 | None |
| 8 | 50 | 50 | 41 | 217 | 2598 | 127 | 88.1 | 166 | None |
| 9 | 0 | 100 | 33 | 1018 | 1887 | 114 | 92.7 | 168 | — |

[a]Values are generally an average of 2 or 3 tests.
[b]MR03
[c]Tests run according to ASTM Test Methods

| Property | Method |
|---|---|
| Izod Impact | D 256 |
| Flexural Modulus | D 790 |
| Flexural Strength | D 790 |
| Tensile Break | D 638 |
| Heat Distortion | D 648 |
| Shrinkage | Visual |

The results presented in Table I show that the shrinkage or warpage of PPS was greatly improved by the incorporation of 1 to 50 weight percent of PACP-9/6. In general, other performance properties such as flexural modulus and flexural strength decreased as the amount of PACP-9/6 was increased, thus, where flexural modulus is important it is desirable to use small amounts of PACP-9/6. Note, however, that the data show that the properties of notched Izod impact strength, flexural strength and heat distortion decrease to a minimum value and then actually began to increase again, reaching an optimum at 50 wt. % PPS/50 wt. % PACP 9/6. Note that the values for notched Izod impact strength, flexural strength, and heat distortion in the 50/50 blend are greater than either component above or for any of the other blends tested. Even though there were decreases in some of the other performance properties tested, none of these seem to be of great significance since all of the values are still very acceptable for a wide range of applications such as previously discussed.

EXAMPLE II

This example illustrates the effectiveness of amorphous polyamides other than the PACP-9/6 type in reducing or eliminating warpage in extruded PPS compositions. The compounding, extruding and evaluation procedure described in Example I was repeated except instead of PACP-9/6 as the additive, other types of polyamides were added. Results are presented in Table II.

TABLE II

Effect of Various Type Polyamides on Shrinkage and Warpage of Molded PPS Compositions
Composition: 85 Wt. % PPS (MR03)
15 Wt. % Polyamides

| Polyamide | Results |
|---|---|
| A. Control (PPS only) | 25% Shrinkage plus warpage |
| B. Crystalline Polyamide | |
| 1. Zytel TM 101 (Nylon-6,6)[a] | Slight shrinkage and warpage |
| C. Amorphous Polyamide | |
| 1. PACP-9/6 | No shrinkage or warpage |
| 2. Zytel 330[b] | No shrinkage or warpage |
| 3. Grilamide TR55[c] | No shrinkage or warpage |
| 4. Trogamide T[d] | No shrinkage or warpage |

[a]Hexamethylene diamine/adipic acid copolymer from DuPont (about 50% crystallinity).
[b]Terephthalic acid-isophthalic acid/hexamethylene diamine polymer from DuPont (less than 2% crystallinity).
[c]Isophthalic acid, bis(4-amino-3-methylcyclohexyl)methane and lauryllactam polymer from Union Carbide (less than 2% crystallinity).
[d]Derived from dimethylterephthalate and trimethylhexamethylene diamines; available from Dyanamit Nobel (less than 2% crystallinity).

The results presented in Table II demonstrate that amorphous polyamides are effective in essentially eliminating the warpage and shrinkage of molded PPS compositions compared to PPS alone or PPS blended with a crystalline polyamide (Nylon-6,6).

That which is claimed:

1. A composition comprising:
   (a) poly(arylene sulfide), and
   (b) about 0.1 to about 100 parts by weight of an amorphous polyamide per 100 parts poly(arylene sulfide); wherein said amorphous polyamide has less than about 20% crystallinity.

2. A composition in accordance with claim 1 wherein the weight ratio of (b) to (a) is about 0.5:100 to about 50:100.

3. A composition in accordance with claim 1 wherein said amorphous polyamide is defined by the following formula:

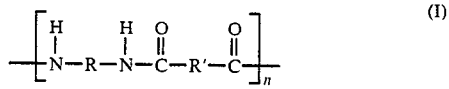

wherein each R and $R^1$ is independently an alkylene radical having one to about 15 carbon atoms; or a cycloalkylene or arylene radical having about 3 to about 16 carbon atoms; or a mixed alkyl-cycloalkyl radical having from about 6 to about 20 carbon atoms; or R can also be represented by structure (II):

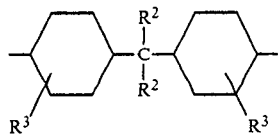

wherein each R² and R³ is independently hyrogen, an alkyl radical having from one to about 15 carbon atoms, a cycloalkyl radical having from about three to about 16 carbon atoms, a mixed alkyl-cycloalkyl radical having from about 6 to about 20 carbon atoms, or an aryl radical having from about 6 to about 20 carbon atoms; and wherein n is a whole number within the range of about 10 to about 500,000.

4. A composition in accordance with claim 1 wherein said amorphous polyamide is selected from the group consisting of:
- a 50:50 mole ratio copolymer of 2,2'-bis(4-amino cyclohexyl) propane and a 60/40 weight percent mixture of azelaic acid and adipic acid;
- an amorphous polyamide derived from a 50:50 ratio of hexamethylene diamine and an equal mixture of terephthalic acid and isophthalic acid;
- an amorphous polyamide derived from isophthalic acid/bis-4-amino-3-methyl cyclohexyl methane/-lauryl lactam; and
- an amorphous polyamide derived from dimethyl-terephthalate and a 50:50 mixture of 2,2,4- and 2,4,4-trimethylhexamethylene diamine.

5. A composition in accordance with claim 1 wherein said amorphous polyamide is,
a 50:50 mole ratio copolymer of 2,2'-bis(4-aminocyclohexyl) propane and a 60/40 weight percent mixture of azelaic acid and adipic acid.

6. A composition in accordance with claim 1 wherein said poly(arylene sulfide) is poly(phenylene sulfide).

7. A composition in accordance with claim 3 wherein said poly(arylene sulfide) is poly(phenylene sulfide).

8. A composition in accordance with claim 4 wherein said poly(arylene sulfide) is poly(phenylene sulfide).

9. A composition in accordance with claim 5 wherein said poly(arylene sulfide) is poly(phenylene sulfide).

10. A method for improving the impact strength and shrinkage or warpage of poly(arylene sulfide) resins which comprises combining poly(arylene sulfide) with at least one amorphous polyamide; wherein the weight ratio of said at least one amorphous polyamide to said poly(arylene sulfide) is about 0.1:100 to about 100:100; and wherein said amorphous polyamide has less than about 20% crystallinity.

11. A method according to claim 10 wherein said weight ratio is about 0.5:100 to about 50:100.

12. A method according to claim 10 wherein said amorphous polyamide is defined by the following formula:

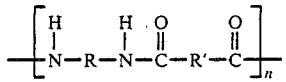

wherein each R and R¹ is independently an alkylene radical having one to about 15 carbon atoms; or a cycloalkylene or arylene radical having about 3 to about 16 carbon atoms; or a mixed alkyl-cycloalkyl radical having from about 6 to about 20 carbon atoms; or R can also be represented by structure (II):

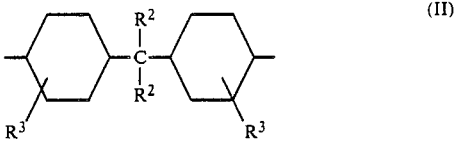

wherein each R² and R³ is independently hydrogen, an alkyl radical having from one to about 15 carbon atoms, a cycloalkyl radical having from about three to about 16 carbon atoms, a mixed alkyl-cycloalkyl radical having from about 6 to about 20 carbon atoms, or an aryl radical having from about 6 to about 20 carbon atoms; and wherein n is a whole number within the range of about 10 to about 500,000.

13. A method according to claim 10 wherein said amorphous polamide is selected from the group consisting of:
- a 50:50 mole ratio copolymer of 2,2'-bis(4-amino cyclohexyl) propane and a 60/40 weight percent mixture of azelaic acid and adipic acid;
- an amorphous polyamide derived from a 50:50 ratio of hexamethylene diamine and an equal mixture of terephthali acid and isophthalic acid;
- an amorphous polyamide derived from isophthalic acid/bis-4-amino-3-methyl cyclohexyl methane/-lauryl lactam; and
- an amorphous polyamide derived from dimethyl-terephthalate and a 50:50 mixture of 2,2,4- and 2,4,4-trimethylhexamethylene diamine.

14. A method according to claim 10 wherein said amorphous polyamide is:
a 50:50 mole ratio copolymer of 2,2'-bis(4-aminocyclohexyl) propane and a 60/40 weight percent mixture of azelaic acid and adipic acid.

15. A method according to claim 10 wherein said poly(arylene sulfide) is poly(phenylene sulfide).

16. A method according to claim 12 wherein said poly(arylene sulfide) is poly(phenylene sulfide).

17. A method according to claim 13 wherein said poly(arylene sulfide) is poly(phenylene sulfide).

18. A method according to claim 14 wherein said poly(arylene sulfide) is poly(phenylene sulfide).

* * * * *